United States Patent [19]

Coltrinari

[11] Patent Number: 5,399,322
[45] Date of Patent: Mar. 21, 1995

[54] SELECTIVE RECOVERY OF DISSOLVED METALS AND PREPARATION OF METAL SALT PRODUCTS

[75] Inventor: Enzo Coltrinari, Golden, Colo.

[73] Assignee: Hazen Research, Inc., Golden, Colo.

[21] Appl. No.: 962,307

[22] Filed: Oct. 15, 1992

[51] Int. Cl.⁶ .............................................. B01D 11/00
[52] U.S. Cl. ..................................... 423/139; 423/140; 423/157; 210/638; 502/29
[58] Field of Search ................... 423/139, 140, 157; 502/29; 210/638

[56] References Cited

U.S. PATENT DOCUMENTS

| | | | |
|---|---|---|---|
| 2,959,465 | 11/1960 | Muro | 23/117 |
| 3,399,055 | 8/1968 | Ritcey | 75/119 |
| 3,718,458 | 2/1973 | Ritcey et al. | 75/119 |
| 3,857,926 | 12/1974 | Beutner et al. | 423/544 |
| 3,869,257 | 3/1975 | Beutner et al. | 423/544 |
| 3,988,151 | 10/1976 | Skarbo et al. | 75/119 |
| 3,988,224 | 10/1976 | Barriere et al. | 204/108 |
| 4,021,532 | 5/1977 | Gandon et al. | 423/544 |
| 4,053,553 | 10/1977 | Reinhardt et al. | 423/105 |
| 4,214,901 | 7/1980 | Michal et al. | 75/119 |
| 4,258,016 | 3/1981 | Siemens et al. | 423/24 |
| 4,343,774 | 8/1982 | Tilley | 423/53 |
| 4,378,275 | 3/1983 | Adamson et al. | 204/119 |
| 4,415,541 | 11/1983 | Melin | 423/140 |
| 4,434,141 | 2/1984 | Hubred et al. | 423/54 |
| 4,522,928 | 6/1985 | McVicker et al. | 502/26 |
| 4,536,214 | 8/1985 | Ochs et al. | 75/101 |

*Primary Examiner*—Mukund J. Shah
*Assistant Examiner*—Matthew V. Grumbling
*Attorney, Agent, or Firm*—Sheridan Ross & McIntosh

[57] ABSTRACT

Discussed is a process for recovering metals and metal-containing products, such as a nickel sulfate product, from aqueous feed solutions comprising two or more dissolved metals. A selected metal is isolated and in a purified form in an aqueous raffinate phase from solvent extraction of nonselected metals using an organic phase containing a salt of an organic acid and the selected metal. Aqueous feed solution may result from leaching operations, including leaching of nickel-containing catalyst, such as catalyst used in hydrogenation of vegetable oils.

32 Claims, 1 Drawing Sheet

SELECTIVE RECOVERY OF DISSOLVED METALS AND PREPARATION OF METAL SALT PRODUCTS

FIELD OF INVENTION

The present invention relates to a process for recovering metals and metal-containing products from aqueous feed solutions, such as those produced during leaching operations, containing two or more dissolved metals. The present invention also relates to preparation of metal salt products, such as preparation of nickel sulfate.

BACKGROUND OF THE INVENTION

Several processes have been proposed for recovering metals or preparing metal products from aqueous solutions containing dissolved metals. Such solutions can result from a variety of sources, including industrial and mining operations. Often, such aqueous solutions result from a leach process to dissolve metals from a solid material.

Many processes have been proposed using liquid-liquid extraction techniques to extract one or more dissolved metals into an immiscible organic phase. Some processes involve several solvent extraction steps to selectively recover metals from the aqueous solution. For example, U.S. Pat. No. 3,988,224 by Barriere et al., issued Oct. 26, 1976, discusses a method for extracting metals from submarine nodules which involves at least three solvent extraction steps.

Solvent extraction procedures are expensive and often difficult to operate. Difficulty and expense generally increase when greater selectivity of extraction is required. Therefore, processes minimizing the number of solvent extraction steps, or requiring lower selectivity of extraction, are desirable.

In addition to extracting a desired metal from a solution, solvent extraction can also be used to extract undesirable contaminants from a solution leaving the desired metal behind in the raffinate. For example, U.S. Pat. No. 3,988,224, noted previously, discusses solvent extraction of some metal impurities from an aqueous chloride solution prior to recovering a metallic nickel product from the solution by electrolysis. Contaminants are extracted by contacting the aqueous solution with an organic phase including a nickel salt of di-(2-ethylhexyl) phosphoric acid.

Removal of contaminants is especially important for the preparation of metal salt products from an aqueous solution. In the process discussed in U.S. Pat. No. 3,988,224, the solution, even after removal of impurities, still contains significant quantities of dissolved magnesium contaminant in addition to the dissolved nickel to be recovered as product by electrolysis. The presence of significant quantities of a residual contaminant, such as magnesium, could create significant problems during recovery of many products from a solution, such as, for example, recovery of a metal salt product.

As noted, one common source of aqueous solutions containing dissolved metals is from leaching operations to dissolve metals from solid materials. Relatively little attention has been given, however, to processes for leaching and recovering metals from spent catalyst. A significant amount of catalyst, often containing valuable metals, is consumed by industry every year. Much of this spent catalyst is disposed of, resulting in significant waste disposal problems as well as the loss of valuable metals.

One valuable metal found in a variety of catalysts is nickel. Nickel catalysts, for example, are used in numerous industrial processes, including hydrogenation of oils, such as vegetable oils. Such nickel catalysts represent a significant source for potential nickel recovery. U.S. Pat. No. 4,415,541 by Melin, issued Nov. 15, 1983, discusses recovering nickel from a spent fat hardening catalyst. Nickel from the catalyst is leached into a sulfate solution, for recovery of the nickel therefrom. U.S. Pat. No. 4,415,541, however, provides no method for recovering a nickel product from the nickel sulfate solution and does not address the problem of metal contaminants which are frequently found in leach liquors.

Needs exist for improved processes for recovering metals and metal products from aqueous solutions containing dissolved metals, and for recovering metal salt products in particular. A need also exists for an efficient process for recovering metal values from spent catalysts, and particularly for recovering nickel values.

SUMMARY OF INVENTION

The present invention involves a process for recovering metals and metal-containing products from aqueous feed solutions containing two or more dissolved metals. Products prepared according to the present invention include solid products comprising metal salts, such as nickel sulfate.

According to the process of the present invention, nonselected metals are extracted from an aqueous feed solution into an organic phase. A selected metal, dissolved in the aqueous feed solution with the nonselected metal, is isolated in a purified form in an aqueous raffinate phase from the extraction of nonselected metals. The organic phase comprises a salt of an organic acid and the selected metal. Use of such an organic phase allows the pH at which nonselected metals are extracted to be controlled while avoiding introduction of detrimental metal contaminants into the raffinate with the selected metal to be isolated.

In one embodiment, prior to the extraction of nonselected metals, a solid material, such as a spent catalyst, can be leached to prepare an aqueous feed solution. Also prior to extraction, metals other than nonselected and selected metals, can be removed from the aqueous feed stream, such as by precipitation of such other metals. Such prior removal of other metals can be accomplished either with or without a leaching step to prepare the aqueous feed solution.

In one embodiment, after extraction of nonselected metals, with or without leaching or removal of other metals, the organic phase can be stripped of nonselected metals and the stripped organic phase can be contacted with a loading solution to load the organic phase with selected metal.

In one embodiment, after extraction of nonselected metals, with or without prior leaching or removal of other metals, a product of the selected metal can be recovered from the raffinate of the extraction step, such as by crystallization of a selected metal salt, such as nickel sulfate.

One embodiment includes, prior to the extraction of nonselected metals, both the leaching of spent catalyst and the removal of other dissolved metals, such as by precipitation, and also includes after extraction, stripping nonselected metals from the organic phase and contacting the stripped organic phase with an aqueous loading solution to load the organic phase with selected metal.

Another embodiment includes, prior to the extraction of nonselected metals, removal of other metals, such as by precipitation, and also includes, after extraction of nonselected metals, stripping nonselected metals from the organic phase, contacting the stripped organic phase with an aqueous loading solution to load the organic phase with selected metal, and recovering a selected metal product from the aqueous raffinate of the extracting step, such as by crystallizing at least a portion of the selected metal as a salt containing product, such as nickel sulfate salt.

The organic phase following extraction, which is loaded with nonselected metals, may be scrubbed to remove remaining selected metal, if desired. Also, nonselected metals may be stripped from the organic phase following extraction using any suitable stripping solution, such as using hydrochloric acid solution, as is preferred in some embodiments.

Prior to extraction of nonselected metals, the organic phase may be loaded with selected metal, such as by contacting the organic phase with a loading solution comprising selected metal, to convert at least a portion of organic acid in the organic phase to a salt of the selected metal. In one embodiment, the selected metal, nickel, is loaded into the organic phase by contacting the organic phase with nickel sulfate mother liquor from a product recovery stage wherein nickel sulfate is crystallized from the aqueous raffinate of the extraction stage.

Aqueous feed solution for the process may come from a variety of sources, including leach liquors from leaching operations. In one embodiment, the aqueous feed solution results from leaching of spent catalyst, such as spent nickel catalyst used in hydrogenating vegetable oils.

In one embodiment, nickel, as the selected metal, is isolated and concentrated in the raffinate of the extraction stage and nonselected metals comprising magnesium and/or calcium are extracted into the organic phase. Preferably, a solid product comprising nickel sulfate is produced by crystallization from the aqueous raffinate.

In a further embodiment, some dissolved metals, such as aluminum or iron, may be precipitated from the aqueous feed solution prior to extraction of nonselected metals.

DETAILED DESCRIPTION OF THE INVENTION

Figure 1:
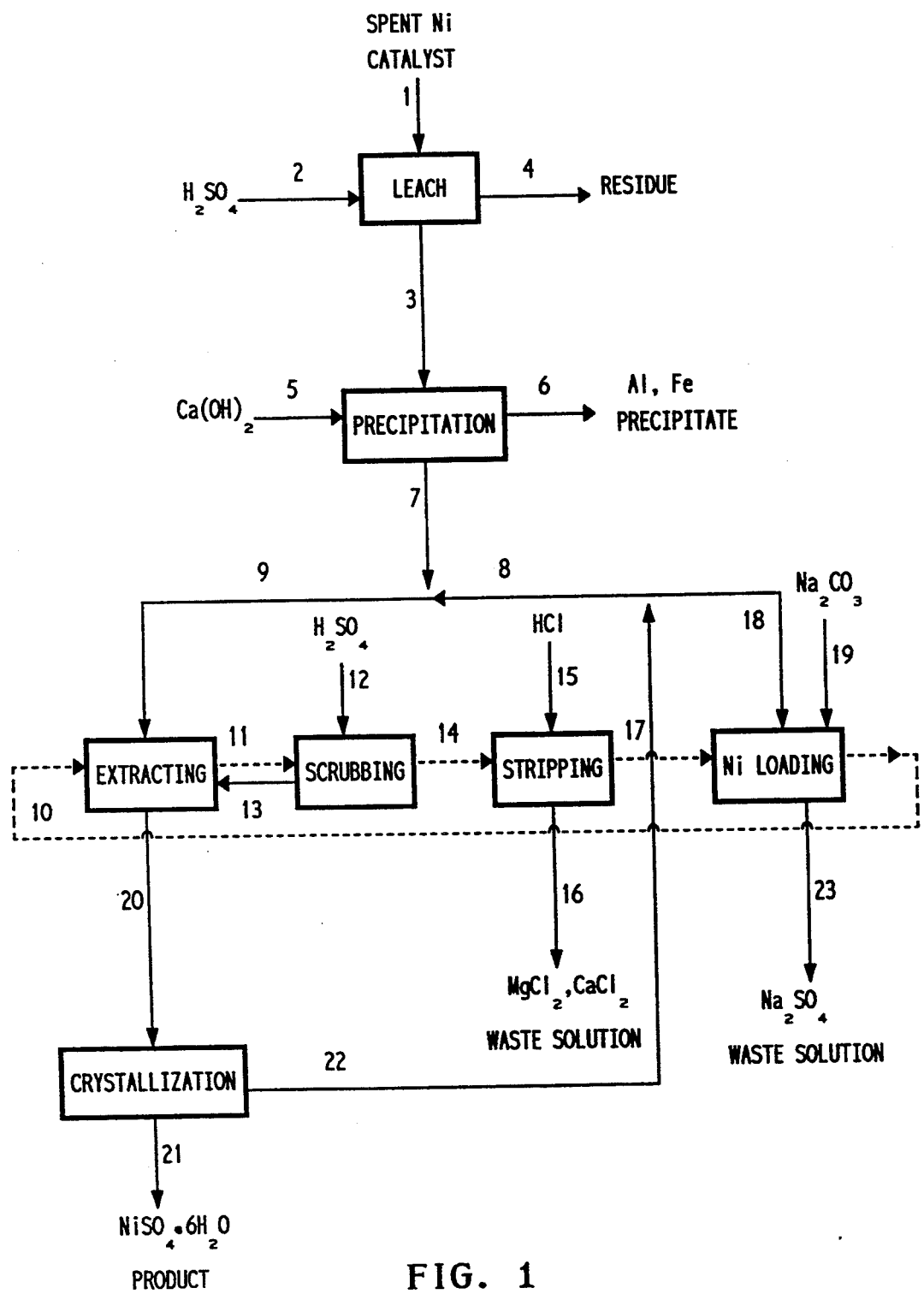
FIG. 1 illustrates one embodiment of the invention involving leach liquor from leaching a nickel-containing catalyst with a sulfuric acid solution and preparation of a nickel sulfate product therefrom.

The present invention involves recovery of purified metal products of a selected metal from solutions containing two or more dissolved metals, especially from solutions resulting from leaching operations. The present invention also involves preparation of metal salt products.

According to the present invention, the selected metal is isolated in a purified aqueous salt solution by extracting other, nonselected metals from an aqueous feed solution by contacting the aqueous feed solution with an organic phase containing a salt of an organic acid, which salt is a salt of the selected metal. Any solvent extraction technique that removes at least a portion of the nonselected metals can be used. Solvent extraction may be accomplished using a single contact stage, but preferably involves multiple contact stages. Preferably, substantially all of the nonselected metals are removed from the aqueous feed solution.

As nonselected metals are extracted from the aqueous feed solution, some selected metal from the organic phase is displaced from the organic phase and is transferred to and dissolves in the aqueous phase. The selected metal is thereby isolated in a purified form in the aqueous raffinate from the solvent extraction operation. The selected metal can then be recovered, in product form, from the aqueous raffinate, if desired.

Such a process for isolating and purifying the desired metal in the raffinate has the advantage of allowing the solvent extraction operation to be conducted within narrow pH ranges, within which nonselected metals are efficiently extracted, without introducing detrimental contaminant metal cations into the raffinate in which the selected metal is to be isolated in a purified form.

The pH of the aqueous phase during solvent extraction is generally important to the efficiency of extraction. In one embodiment, the pH of extraction, as measured by the pH of the resulting raffinate, is maintained at a pH from about pH 4.0 to about pH 6.0, more preferably from about pH 4.5 to about pH 5.5, and even more preferably from about pH 4.8 to about pH 5.2. Particularly preferred is extraction at a pH of about pH 5.0.

Using a selected metal salt of an organic acid as an active extractant in the organic phase helps to control the pH during extraction. With an organic acid extractant hydrogen ions are transferred during extraction from the organic acid in the organic phase to the aqueous phase, thereby lowering the pH of the aqueous phase. Such lowering of the pH may be detrimental to the efficiency of the extraction of nonselected metals from the aqueous phase.

The organic phase can be loaded with a salt of the organic acid to reduce or prevent such transfer of hydrogen ions, as desired, to the aqueous solution during solvent extraction, thereby avoiding detrimental changes to pH in the aqueous solution. As used herein, loading of an organic phase with selected metal refers to increasing the concentration of the selected metal in the organic phase, and an organic phase loaded with selected metal refers to an organic phase containing a concentration of selected metal sufficient for controlling the pH of extraction at the desired pH. By using, in the solvent extraction operation, an organic phase loaded with a salt of an organic acid that is a salt of the selected metal, transfer of selected metal from the organic phase to the aqueous phase occurs during solvent extraction, thereby significantly reducing or preventing transfer of hydrogen ions which would otherwise occur by use of an organic acid extractant, alone.

Using salts of the organic acid of metals other than the selected metal could also be effective to control the pH of extraction of nonselected metals from an aqueous feed solution, but using such other metals could introduce cations of those other metals as contaminants into the aqueous raffinate. Adding external reagents, such as acid or base forming material, during extraction could likewise be effective to control the pH of extraction, but such reagents could also introduce contaminant cations into the raffinate.

Loading of the organic phase with selected metal therefore accomplishes the dual advantages of controlling the pH of the aqueous feed solution during extraction of nonselected metals to promote efficient extraction and also preventing the introduction of detrimental contaminant cations metals into the aqueous raffinate from which product is to be recovered according to the present invention.

As discussed in more detail below, residual selected metal remaining in the organic phase following solvent extraction can be scrubbed from the organic phase using any suitable scrubbing solution for removing residual selected metal from the organic phase.

As discussed in more detail below, nonselected metals can be stripped from the organic phase using any suitable stripping solution, preferably an aqueous stripping solution and more preferably an acidic aqueous stripping solution. When using many stripping solutions, such as acidic stripping solutions, organic acid is generated in the organic phase during the stripping operation as nonselected metals are stripped from the organic phase. The resulting organic phase can then be loaded with selected metal prior to the extraction step, as previously described. Preferably, such loading is accomplished by contacting the organic phase with a liquid that contains selected metal, and more preferably an aqueous solution containing dissolved selected metal. Alternatively, fresh make-up organic phase, which is typically rich in organic acid, can likewise be treated to load the fresh organic phase with the selected metal.

The level of loading of selected metal in the organic phase, according to the present invention, depends on the quantity of nonselected metals to be extracted from the aqueous phase, the nature and pH of the aqueous feed solution, the pH at which extraction will be most effective, and physical conditions of extraction. Generally, the greater the loading of the organic phase with selected metal, the higher will be the pH during extraction of nonselected metals from the aqueous feed solution. For any combination of feed solution, organic phase, and metal constituents, effective conditions for extraction, including an appropriate level of loading of selected metal in the organic phase, can be determined by one having ordinary skill in the art without undue experimentation.

As selected metal cations are transferred from the loading solution to the organic phase during the loading operation, to form the desired salt of the organic acid, positively charged hydrogen ions are transferred from the organic acid to the aqueous phase, thereby tending to alter the pH of the aqueous phase. To effect the desired loading of the organic phase with the selected metal, it may be necessary to alter or control the pH during the loading operation. For example, when loading the organic phase from an acidic aqueous sulfate solution, the pH could be adjusted upward by the addition of base forming materials, such as sodium hydroxide or sodium carbonate, as needed. Most of the cations from such a reagent will exit the loading operation with the spent aqueous loading solution, which will generally be a waste solution, and will therefore not contaminate the organic phase. Such pH adjustment may, however, introduce a minor quantity of an impurity, such as sodium cations from the reagent, into the organic phase, and consequently into the aqueous raffinate in which the selected metal is to be isolated in a purified form. Such minor quantities of impurities are not detrimental to the operation of the present invention.

The organic phase, loaded to a desired level with a selected metal salt of an organic acid, can then be cycled to the extraction stage to extract nonselected metals from the aqueous feed solution, as previously described.

Suitable aqueous feed solutions to the solvent extraction step comprise any aqueous solution containing two or more dissolved metals in salt form. Such aqueous feed solutions can be either basic, such as for example ammoniacal solutions, or can be acidic. Preferably, the aqueous feed solution is acidic, and more preferably such dissolved metals are present in the solution as sulfate salts. Such metals could however be present in the form of other salts, such as, for example, chloride or nitrate salts.

Suitable aqueous feed solutions for the present invention could come from various sources including from industrial or mining operations. In one embodiment, the aqueous feed solution is a leach liquor containing dissolved metals leached from solids, such as from metal-containing ores. In one preferred embodiment, such leach liquor results from the leaching of spent catalyst, and more preferably from the leaching of spent nickel catalyst, and most preferably from the leaching of spent nickel catalyst used in the hydrogenation of oils. Such catalyst is preferably leached with an acidic solution, and more preferably a sulfuric acid solution, thereby producing a leach liquor containing dissolved metals as sulfate salts.

The organic acid used in the organic phase can be any organic compound containing one or more acid groupings that can form a salt with the selected metal to be isolated in a purified form in the aqueous raffinate phase from the extraction stage. Examples include phosphoric acids, such as di-(2-ethylhexyl) phosphoric acid, phosphonic acids, and phosphinic acids. Preferably, the organic acid is a phosphonic acid, such as 2-ethylhexyl 2-ethylhexylphosphonic acid, commercial examples of which are PC-88A TM by Daihachi Chemical Industry Co., Ltd. and Ionquest® 801 by Albright & Wilson. The specific organic acid to be used in the organic phase will depend upon the relative selectivity of acids for the metal that is to be isolated and concentrated into the aqueous raffinate phase and the other metals to be separated therefrom.

In a preferred embodiment, nickel is the selected metal, which is to be isolated from other metals. It should be understood that by selected or nonselected metal is meant the metallic form of metal and also all cationic forms of the metal. Therefore, nickel includes metallic nickel and all cationic forms of nickel. Preferably, the nonselected metals comprise metals selected from the group consisting of magnesium, calcium, and combinations thereof.

The organic acid, and therefore the corresponding salt of the organic acid, can be dissolved in any suitable organic solvent to make up the organic phase for solvent extraction in a liquid-liquid extraction operation. Such suitable solvents include, for example, petroleum distillates, which can be either alkyl or aromatic, or other solvents, such as hexane. The organic phase is preferably completely immiscible with the aqueous feed solution.

In a preferred embodiment, nickel is the selected metal to be isolated in the raffinate and magnesium and/or calcium are nonselected metals to be extracted into the organic phase. Preferably, the aqueous feed solution is an acidic sulfate solution. Preferably, the pH of extraction is at a pH from about pH 4.0 to about pH 6.0, more preferably from about pH 4.5 to about pH 5.5, and even more preferably from about pH 4.8 to about pH 5.2. Particularly preferred is extraction at a pH of about pH 5.0. The organic acid is preferably a phosphonic acid, such as those discussed previously.

In one embodiment, as previously mentioned, following extraction of nonselected metals into the organic phase, the organic phase is scrubbed with an aqueous solution to remove residual selected metal remaining in the organic phase. Any suitable aqueous scrubbing solution that removes at least a portion of remaining selected metal from the organic phase can be used. Preferably, substantially all of the remaining selected metal is removed from the organic phase during scrubbing. Preferably, selected metal removed to the scrubbing solution will form a dissolved salt of the selected metal in the scrubbing solution that is the same as the dissolved salt of the selected metal in the raffinate from the extraction operation. In this instance, the scrubbing solution loaded with selected metals is preferably combined with the raffinate.

For example, in one preferred embodiment, nonselected metals comprising magnesium and/or calcium are extracted from a sulfate solution into an organic phase comprising a nickel salt of a phosphonic acid. Nickel is isolated in the aqueous sulfate raffinate. The scrubbing solution for such an embodiment is preferably an acidic aqueous sulfate solution, such as sulfuric acid, which is combined with the raffinate after the scrubbing solution is loaded with nickel in the scrubbing operation.

In one embodiment, as previously mentioned, nonselected metals that have been extracted into the organic phase are stripped from the organic phase, either without or, preferably, with a prior scrubbing step as previously described, using any suitable aqueous stripping solution that will strip at least a portion of nonselected metals from the organic phase. Preferably, such stripping removes substantially all of the nonselected metals from the organic phase. Preferably, the stripping solution is an aqueous solution, and more preferably is an acidic aqueous solution.

In one preferred embodiment, calcium and/or magnesium are extracted as nonselected metals, leaving nickel as the selected metal in the raffinate. In such a preferred embodiment, the organic phase, prior to extraction, preferably comprises a nickel salt of a phosphonic acid, and the stripping solution is preferably acidic and more preferably comprises hydrochloric acid.

During stripping, hydrogen ions are transferred to the organic phase, as previously discussed, as nonselected metals are stripped from the organic phase, thereby producing organic acid in the organic phase. Prior to cycling this stripped organic phase to the extraction step for extracting additional nonselected metals, if desired, it is necessary to load the stripped organic phase with selected metal by converting a sufficient amount of organic acid to a salt of the selected metal, also as previously discussed.

Such loading of the organic phase with the desired metal can be accomplished by contacting the acid rich organic phase with any suitable loading solution, preferably an aqueous loading solution, under conditions resulting in the transfer of the selected metal from the aqueous phase to the organic phase, with corresponding transfer of hydrogen ions from the organic phase to the aqueous phase. For example, a portion of the aqueous raffinate from the extraction step may be used as a loading solution for loading the organic with the selected metal. Mother liquor from a product recovery step, such as from crystallization of a salt product of the selected metal from the raffinate, could also be used as a loading solution. As used herein, mother liquor refers to solution remaining after recovery of selected metal from the raffinate using any product recovery technique that results in such a remaining solution containing unrecovered dissolved selected metal, such as for example solution remaining after crystallization of some selected metal salt product from the raffinate. As previously discussed, it may be necessary to add a small quantity of reagent to adjust the pH during the loading operation to promote effective transfer of the selected metal from the aqueous loading solution to the organic phase, and thereby load the organic with the appropriate amount of selected metal.

In a preferred embodiment, the aqueous feed solution is an acidic sulfate solution, the selected metal is nickel and nonselected metals comprise calcium and/or magnesium. In such an embodiment, nickel loading of the organic phase is preferably accomplished by contacting the acid rich organic phase with nickel sulfate raffinate, or more preferably with a nickel sulfate mother liquor from crystallization of a nickel sulfate product from the raffinate. A sufficient quantity of a base forming material, such as sodium carbonate or sodium hydroxide, can be added during the loading step to adjust the pH to a pH at which nickel will load into the organic phase to the desired level.

In one embodiment, the aqueous raffinate from the extraction operation is sent to a metal product recovery stage, wherein the selected metal can be recovered, such as by electrowinning or precipitation. Preferably, such selected metal is recovered as a purified solid salt product by any appropriate means, preferably by crystallization. Crystallization can be accomplished by any suitable means, such as, for example by cooling crystallization or evaporative crystallization. Mother liquor, or a portion thereof, from such a product recovery stage can be cycled within the process, such as to upstream of the extraction operation to combine with the aqueous feed solution, or for use as a loading solution in the loading operation, or both.

In a preferred embodiment, nickel sulfate crystals such as, for example, in form of nickel sulfate hexahydrate, are recovered by any suitable crystallization procedure. After removal of the crystals by any appropriate means, such as by use of a centrifuge or cyclone, the resulting nickel sulfate mother liquor is cycled for use to load nickel into the acid rich organic phase prior to solvent extraction. Any nickel sulfate mother liquor in excess of that required for nickel loading of the organic phase is cycled to combine with the aqueous feed solution upstream of the extraction operation.

In one embodiment of the present invention, some dissolved metals are removed from the aqueous feed solution prior to the solvent extraction step, thereby reducing the number and/or amount of nonselected metals to be removed in the extraction step. Such upstream removal of some dissolved metals can be accomplished using any known techniques such as ion exchange, solvent extraction, and precipitation. Preferably, such removal is by precipitation. In one preferred embodiment, metals comprising dissolved aluminum and/or dissolved iron are removed from the feed solution prior to solvent extraction. Preferably, such aluminum and/or iron are removed from the solution by precipitating aluminum and/or iron, preferably as insoluble hydroxides.

In one preferred embodiment, the aqueous feed solution contains dissolved aluminum and/or iron, aqueous magnesium and/or calcium, and dissolved nickel in a sulfate solution. Aluminum and/or iron are removed by precipitation prior to solvent extraction of nonselected metals comprising calcium and/or magnesium. Precipitation may be effected using any standard precipitation technique, such as by adding a hydroxide, such as calcium hydroxide, or some other precipitating agent, under appropriate conditions of pH and temperature to form precipitate. Nickel, magnesium, and/or calcium remaining in the solution are then fed to the solvent extraction stage wherein nonselected metals are extracted, as previously described.

In one embodiment, the aqueous feed solution is a leach liquor from a leaching process wherein metal-containing solid material is leached and metals dissolved into the leach liquor. Various solids can be leached, including scrap metals or metal-containing ores. In one preferred embodiment, nickel catalysts, such as those used in the hydrogenation of vegetable oils, are leached, preferably with an acidic aqueous solution, more preferably with an acidic aqueous sulfate solution, such as an aqueous solution comprising sulfuric acid, resulting in a leach liquor containing dissolved nickel, the selected metal, and other metals. Such other metals are for example aluminum, iron, magnesium, and/or calcium.

The present invention will now be described by reference to one preferred embodiment of the invention as shown in FIG. 1. Spent nickel catalyst 1 used in the hydrogenation of vegetable oils is leached with a sulfuric acid solution Z to dissolve nickel and smaller quantities of aluminum, iron, magnesium and calcium, producing an aqueous feed solution 3 and a leach residue 4. Calcium hydroxide 5 is then added to the solution to precipitate aluminum and iron as insoluble hydroxides 6. The solution 7 comprising dissolved nickel, magnesium and calcium is then combined with nickel sulfate mother liquor 8 cycled from the product recovery stage. The aqueous feed solution 9, now containing the cycled mother liquor 8, is contacted in a solvent extraction step with an organic phase 10, which comprises a nickel salt of a phosphonic acid, such as IonQuest® 801 or PC88A ™, as previously described Solvent extraction is conducted at a pH of approximately pH 5. Nickel remaining in the organic phase following extraction 11 of calcium and magnesium is scrubbed using a sulfuric acid scrubbing solution 12, and nickel scrubbed into the sulfuric acid solution 13 is returned to the solvent extraction step to combine with the aqueous raffinate from the extraction stage. Calcium and magnesium in the scrubbed organic phase 14 are then stripped from the organic phase using a hydrochloric acid stripping solution 15 to produce a waste solution 16 comprising chlorides of magnesium and calcium. The stripped organic phase 17, and fresh make-up organic, as required, are then contacted with recycled nickel sulfate mother liquor 18 from the product recovery stage to load the organic phase with an appropriate quantity of nickel salt of the organic acid. Recycled nickel sulfate mother liquor not required for nickel loading of the organic phase 8 is combined with the feed solution 7, as previously described. A small quantity of a base forming material, such as sodium carbonate 19, is added during the nickel loading step in order to adjust the pH to assist nickel loading. Most of the added sodium exits in an aqueous sodium sulfate waste stream 23. The organic 10 comprising nickel salt of a phosphonic acid is then cycled to the solvent extraction step for extraction of nonselected metals, as previously described. The aqueous phase raffinate 20 from the solvent extraction step, at a pH of about pH 5, comprises a purified nickel sulfate solution that is sent to a crystallization step wherein a product 21 comprising nickel sulfate crystals is prepared. Nickel sulfate mother liquor 22 from the crystallization step is cycled in the process to the nickel loading and extraction stages, as previously described.

The following examples are provided for the purpose of illustrating the present invention and are not intended to limit the scope of the invention in any manner.

EXAMPLE 1

This example illustrates the extraction at pH 4.9 of nonselected metals magnesium and calcium from an aqueous feed solution wherein the selected metal is nickel.

An organic phase is prepared using 20 percent by volume of PC-88A ™, a phosphonic acid by Daihachi Chemical Industry Co., Ltd., in an aliphatic organic solvent, Escaid ™ 110 distributed by Exxon. The organic phase is then loaded with nickel, to form a nickel salt of the phosphonic acid, by contacting 600 milliliters of the organic with 300 milliliters of a nickel sulfate solution containing 14 grams per liter of nickel. To facilitate nickel loading, the pH is adjusted to pH 5.5 using 36.3 grams of 16 percent sodium hydroxide solution. The nickel loaded organic phase contains 5.65 grams per liter of nickel.

An aqueous sulfate feed solution is prepared containing 58 grams per liter dissolved nickel, 2.42 grams per liter dissolved magnesium, and 0.59 grams per liter dissolved calcium. Magnesium and calcium are extracted from the feed solution in a three stage extraction process. In the first stage, 100 milliliters of the feed solution is contacted with 200 milliliters of organic phase. In the second stage, 80 milliliters of raffinate from the first stage is contacted with 160 milliliters of organic phase. In the third stage, 60 milliliters of raffinate from the second stage is contacted with 180 milliliters of the organic phase.

Table 1 shows results of the test and demonstrates that nickel sulfate has been concentrated in a purified form into the raffinate of the third stage, while the pH of the raffinate phases has remained essentially constant.

TABLE 1

| Sample | pH | Ni (g/l) | Ca (g/l) | Mg (g/l) |
|---|---|---|---|---|
| Feed | 4.9 | 58 | 0.59 | 2.42 |
| Ni loaded organic | | 5.65 | <0.01 | <0.01 |
| # 1 Raffinate | 4.7 | 62 | 0.027 | 0.94 |
| # 1 Ca/Mg loaded organic | | 4.30 | 0.63 | 0.73 |
| # 2 Raffinate | 4.7 | 61 | <0.005 | 0.38 |
| # 2 Ca/Mg loaded organic | | 5.73 | <0.01 | 0.28 |
| # 3 Raffinate | 4.7 | 59 | <0.005 | 0.11 |
| # 3 Ca/Mg loaded organic | | 6.14 | <0.01 | 0.087 |

EXAMPLE 2

This example further illustrates separation of nonselected metals magnesium and calcium from nickel as a selected metal at a higher pH than in Example 1 resulting in a higher distribution coefficient for Mg to get a more efficient separation.

Approximately 600 milliliters of an organic phase, having the same makeup as that of Example 1, is loaded with nickel by contacting the organic phase with 400 milliliters of a nickel sulfate solution containing 29.6 grams per liter nickel. Approximately 49.5 grams of 16 percent sodium hydroxide solution was added to adjust the pH to 5.4 to facilitate effective loading of the organic with nickel. The organic phase, as loaded with nickel, contains 9.06 grams per liter of nickel. An aqueous sulfate feed solution is prepared containing 61 grams per liter dissolved nickel, 2.56 grams per liter dissolved magnesium, 0.57 grams per liter dissolved calcium, and 0.17 grams per liter dissolved sodium.

Magnesium and calcium are extracted from the aqueous feed solution in a three stage extraction process at pH 5.1. In the first stage, 100 milliliters of aqueous feed solution is contacted with 150 milliliters of organic phase. In the second stage, 75 milliliters of raffinate from the first stage is contacted with 225 milliliters of organic phase. In the third stage, 50 milliliters of raffinate from the second stage is contacted with 150 milliliters of organic phase. The results are shown in Table 2.

TABLE 2

| Sample | pH | Ni (g/l) | Ca (g/l) | Mg (g/l) | Na (g/l) |
|---|---|---|---|---|---|
| Feed | | 61 | 0.57 | 2.56 | 0.17 |
| Ni loaded organic | | 9.6 | <0.01 | <0.01 | 0.33 |
| #1 Raffinate | 5.1 | 64 | 0.064 | 0.86 | |
| #1 Ca/Mg loaded organic | | | 6.48 | 1.08 | |
| #2 Raffinate | 5.1 | 61 | <0.01 | 0.24 | |
| #2 Ca/Mg loaded organic | | | 8.89 | 0.21 | |
| #3 Raffinate | 5.1 | 61 | <0.01 | 0.074 | 2.0 |
| #3 Ca/Mg loaded organic | | | 9.36 | 0.59 | |

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed:

1. A process for recovering nickel values from spent catalyst, comprising:
   (a) leaching said catalyst with an aqueous leach solution to produce an aqueous feed solution comprising first dissolved metal selected from the group consisting of magnesium, calcium and combinations thereof and second dissolved metal, wherein said second dissolved metal is nickel; and
   (b) extracting at least a portion of said first dissolved metal from said aqueous feed solution into an organic phase comprising a salt of an organic acid wherein said salt comprises a salt of said second dissolved metal, and wherein at least a portion of said second dissolved metal in said salt is transferred from said organic phase into solution in the aqueous phase from which said first dissolved metal is extracted to replace extracted first dissolved metal, which aqueous phase is separated from said organic phase.

2. The process of claim 1, further comprising contacting said organic phase with a loading solution comprising said second dissolved metal to convert at least a portion of organic acid in said organic phase to said salt of said second dissolved metal.

3. The process of claim 1, further comprising stripping into a strip solution at least a portion of said first dissolved metal from said organic phase after the extracting in step (b).

4. The process of claim 1, wherein said first dissolved metal comprises magnesium.

5. The process of claim 1, further comprising recovering a product comprising at least a portion of said second dissolved metal from an aqueous raffinate of said extracting in step (b).

6. The process of claim 5, wherein said recovering step further comprises crystallizing a solid product comprising nickel sulfate.

7. The process of claim 1, wherein said aqueous leach solution in step (a) comprises sulfuric acid.

8. The process of claim 1, wherein said extracting in step (b) is at a pH from about pH 4.5 to about pH 5.5.

9. A process for recovering dissolved metal values from an aqueous sulfate feed solution comprising first dissolved metal comprising metals selected from the group consisting of magnesium, calcium and combinations thereof and second dissolved metal consisting of nickel, comprising:
   (a) extracting at a pH from about pH 4.5 to about pH 5.5 at least a portion of said first dissolved metal from said aqueous sulfate feed solution into an organic phase comprising a salt of a phosphonic acid wherein said salt is a salt of said second dissolved metal and wherein at least a portion of said second dissolved metal in said salt is transferred from said organic phase into solution in the aqueous phase from which said second dissolved metal is extracted to replace extracted first dissolved metal which aqueous phase is separated from said organic phase;
   (b) stripping into an acidic aqueous strip solution comprising hydrochloric acid at least a portion of said first dissolved metal from said organic phase after said extracting in step (a); and
   (c) contacting the stripped organic phase from step (b) with an aqueous sulfate loading solution comprising said second dissolved metal to convert at least a portion of organic acid in said stripped organic phase to a salt of said second dissolved metal.

10. A process for recovering metal values from spent catalyst, comprising:
   (a) leaching said spent catalyst with an acidic aqueous liquid to dissolve at least a portion of said metals into said acidic aqueous liquid to form an aqueous feed solution comprising first dissolved metal selected from the group consisting of magnesium, calcium and combinations thereof, second dissolved metal consisting of nickel, and third dissolved metal selected from the group consisting of aluminum, iron III and combinations thereof;

(b) precipitating from said aqueous feed solution at least a portion of said third dissolved metal as insoluble hydroxides;

(c) extracting at a pH from about pH 4.5 to about pH 5.5 at least a portion of said first dissolved metal from said aqueous feed solution into an organic phase comprising a salt of a phosphonic acid wherein said salt is a salt of said second dissolved metal and wherein at least a portion of said second dissolved metal in said salt is transferred from said organic phase into solution in the aqueous phase from which said first dissolved metal is extracted to replace extracted first dissolved metal which aqueous phase is separated from said organic phase;

(d) stripping into an acidic aqueous strip solution at least a portion of said first dissolved metals from said organic phase after the extracting in step (c); and (e) contacting the stripped organic phase from step (d) with an aqueous loading solution comprising said second dissolved metal to convert at least a portion of phosphonic acid in said stripped organic phase to a salt of said second dissolved metal.

11. A process for recovering dissolved metal values from an aqueous feed solution comprising first dissolved metal selected from the group consisting of magnesium, calcium and combinations thereof and second dissolved metal which is nickel, comprising extracting at least a portion of said first dissolved metal from said aqueous feed solution into an organic phase comprising a salt of an organic acid wherein said salt comprises a salt of said second dissolved metal, and wherein at least a portion of said second dissolved metal in said salt is transferred from said organic phase into solution in the aqueous phase from which said first dissolved metal is extracted to replace extracted first dissolved metals, which aqueous phase is separated from said organic phase.

12. The process of claim 11, wherein said first dissolved metal comprises magnesium.

13. The process of claim 11, further comprising contacting said organic phase with a loading solution comprising said second dissolved metal to convert at least a portion of organic acid in said organic phase to said salt of said second dissolved metal.

14. A process for recovering dissolved metals from an aqueous feed solution comprising first dissolved metal selected from the group consisting of magnesium, calcium and combinations thereof and second dissolved metal which is nickel, comprising extracting at a pH from about pH 4.0 to about pH 6.0 at least a portion of said first dissolved metal from said aqueous feed solution into an organic phase comprising a salt of an organic acid wherein said salt comprises a salt of said second dissolved metal, and wherein at least a portion of said second dissolved metal in said salt is transferred from said organic phase into solution in the aqueous phase from which said first dissolved metal, which aqueous phase is separated from said organic phase is extracted to replace extracted first metal.

15. The process of claim 14, further comprising contacting said organic phase with a loading solution comprising said second dissolved metal to convert at least a portion of organic acid in said organic phase to a salt of said second dissolved metal.

16. The process of claim 14, further comprising stripping into a strip solution at least a portion of said first dissolved metal from said organic phase after said extracting.

17. The process of claim 14, wherein said first dissolved metal comprises magnesium.

18. The process of claim 14, wherein said extracting is at a pH of from about pH 4.5 to about pH 5.5.

19. The process of claim 14, wherein said extracting is at a pH of from about pH 4.8 to about pH 5.2.

20. The process of claim 14, wherein said aqueous feed solution is an aqueous sulfate solution.

21. The process of claim 14, wherein said organic acid comprises a phosphonic acid.

22. A process for recovering dissolved metal values from an aqueous feed solution comprising first dissolved metal selected from the group consisting of magnesium, calcium and combinations thereof, second dissolved metal which is nickel, and third dissolved metal selected from the group consisting of aluminum, iron III and combinations thereof, comprising:

(a) precipitating from said aqueous feed solution at least a portion of said third dissolved metal; and (b) extracting at least a portion of said first dissolved metal from said aqueous feed solution into an organic phase comprising a salt of an organic acid wherein said salt comprises a salt of said second dissolved metal and wherein at least a portion of said second dissolved metal in said salt is transferred from said organic phase into solution in the aqueous phase from which said first dissolved metal is extracted to replace extracted first dissolved metal, which aqueous phase is separated from said organic phase.

23. The process of claim 22, further comprising contacting said organic phase with a loading solution comprising said second dissolved metal to convert at least a portion of organic acid in said organic phase to a salt of said second dissolved metal.

24. The process of claim 22, further comprising stripping into a strip solution at least a portion of said first dissolved metal from said organic phase after the extracting in step (b).

25. The process of claim 22, wherein said extracting in step (b) is at a pH from about pH 4.5 to about pH 5.5.

26. The process of claim 22, wherein said organic acid is a phosphonic acid.

27. The process of claim 22, wherein said step (a) further comprises precipitating said portion of third dissolved metal as insoluble hydroxides of said third dissolved metal.

28. A process for preparing a product comprising a solid salt of second dissolved metal from an aqueous feed solution comprising first dissolved metal selected from the group consisting of magnesium, calcium and combinations thereof and second dissolved metal which is nickel, comprising:

(a) extracting at least a portion of said first dissolved metal from said aqueous feed solution into an organic phase comprising a salt of an organic acid wherein said salt of said organic acid is a salt of said second dissolved metal, and wherein at least a portion of said second dissolved metal in said salt of said organic acid is transferred from said organic phase into solution in the aqueous phase from which said first dissolved metal is extracted to replace extracted first dissolved metal which aqueous phase is separated from said organic phase as an aqueous raffinate; and (b) recovering a product comprising a solid salt of said second dissolved metal from said aqueous raffinate.

29. The process of claim 28, further comprising stripping into an acidic aqueous strip solution at least a portion of said first dissolved metal from said organic phase after the extracting in step (a) and contacting the stripped organic phase with an aqueous loading solution comprising said second dissolved metal to convert at least a portion of organic acid in said stripped organic phase to a salt of said second dissolved metal.

30. The process of claim 28, wherein said recovering in step (b) comprises crystallizing said solid salt of said second dissolved metal from said aqueous raffinate of the extracting in step (a).

31. The process of claim 28, wherein said solid salt comprises nickel sulfate.

32. A process for preparing solid product comprising nickel sulfate from an aqueous sulfate feed solution comprising first dissolved metal selected from the group consisting of calcium, magnesium and combinations thereof, second dissolved metal comprising nickel, and third dissolved metal selected from the group consisting of aluminum, iron III and combinations thereof, comprising:

(a) precipitating from said aqueous feed solution at least a portion of said third dissolved metal as insoluble hydroxides;

(b) extracting at a pH from about pH 4.5 to about pH 5.5 at least a portion of said first dissolved metal from said aqueous feed solution into an organic phase comprising a salt of a phosphonic acid wherein said salt is a salt of said second dissolved metal and wherein at least a portion of said second dissolved metal in said salt is transferred from said organic phase into solution in the aqueous phase from which said first dissolved metal is extracted to replace extracted first dissolved metal, which aqueous phase is separated from said organic phase;

(c) stripping into a acidic aqueous strip solution at least a portion of said first dissolved metals from said organic phase after the extracting in step (b);

(d) contacting the stripped organic phase from step (c) with an aqueous loading solution comprising said second dissolved metal to convert at least a portion of phosphonic acid in said stripped organic phase to a salt of said second dissolved metal; and (e) crystallizing from an aqueous raffinate of the extracting in step (b) at least a portion of said second dissolved metal in a form comprising nickel sulfate.

* * * * *